(12) United States Patent
Gapontsev et al.

(10) Patent No.: US 8,139,912 B2
(45) Date of Patent: Mar. 20, 2012

(54) DOUBLE CLAD OPTICAL FIBER HAVING RING CORE SURROUNDING CORE FOR HIGH POWER OPERATION

(75) Inventors: Valentin P Gapontsev, Worcester, MA (US); Nikolai Platonov, Worcester, MA (US); Roman Yagodkin, Worcester, MA (US); Volodia Sergueev, Burbach (DE)

(73) Assignee: IPG Photonics Corporation, Oxford, MA (US)

( * ) Notice: Subject to any disclaimer, the term of this patent is extended or adjusted under 35 U.S.C. 154(b) by 333 days.

(21) Appl. No.: 12/580,358

(22) Filed: Oct. 16, 2009

(65) Prior Publication Data

US 2011/0091178 A1    Apr. 21, 2011

Related U.S. Application Data

(63) Continuation of application No. 12/508,223, filed on Oct. 15, 2009.

(51) Int. Cl.
*G02B 6/02* (2006.01)
(52) U.S. Cl. ........ 385/127; 385/123; 385/124; 385/125; 385/126; 385/128
(58) Field of Classification Search .................. 385/123, 385/124, 125, 126, 127, 128
See application file for complete search history.

(56) References Cited

U.S. PATENT DOCUMENTS

| | | | |
|---|---|---|---|
| 6,157,763 A * | 12/2000 | Grubb et al. | 385/126 |
| 6,687,046 B2 * | 2/2004 | Leplingard et al. | 359/337.4 |
| 7,526,167 B1 * | 4/2009 | Minelly | 385/126 |

* cited by examiner

*Primary Examiner* — Jennifer Doan
(74) *Attorney, Agent, or Firm* — Yuri Kateshov; Timothy J. King

(57) ABSTRACT

An optical fiber apparatus having a wavelength of operation comprises an optical fiber comprising a core; a pump cladding disposed about the core for receiving pump optical energy having a pump wavelength; and a second cladding disposed about for tending to confine pump optical energy to the pump cladding. The core can comprise a rare earth material for providing optical energy having the wavelength of operation responsive to the optical fiber receiving the pump optical energy, and the fiber can further comprise at least one ring core spaced from the core, the ring core defined by inner and outer diameters and comprising the cross sectional area therebetween. The ring core can comprise an absorbing material for absorbing optical energy having the wavelength of operation. At the wavelength of operation the optical fiber can comprise a fundamental mode that is primarily a mode of the core and at least one higher order mode (HOM) that is a mixed mode of a selected mode of the core and of a selected mode of the ring core, the selected modes being of the same azimuthal order. The mixed mode can be suppressed relative to the fundamental mode.

20 Claims, 13 Drawing Sheets

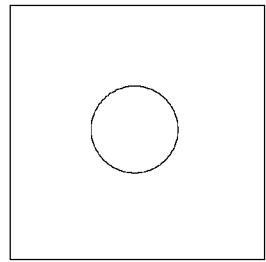
LP(1) = $LP_{01}$
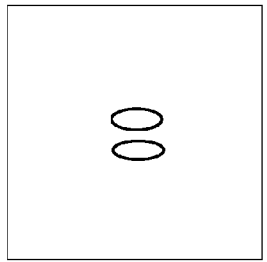
LP(2) = $LP_{11o}$
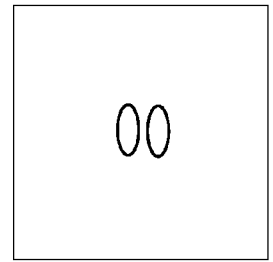
LP(3) = $LP_{11e}$
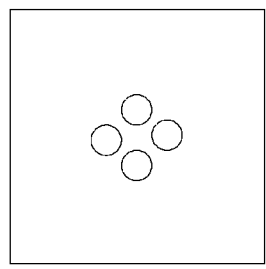
LP(4) = $LP(5)_{21o}$
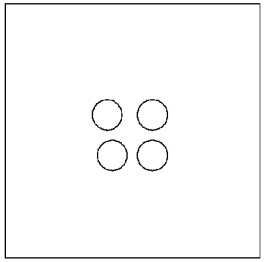
LP(5) = $LP(5)_{21e}$
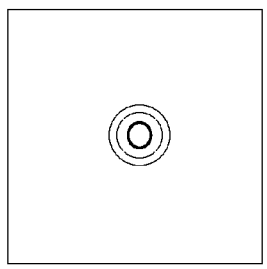
LP(6) = $LP_{02}$
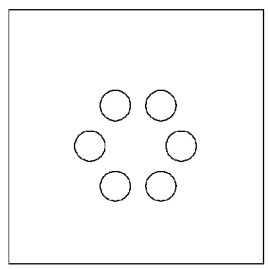
LP(7) = $LP_{31o}$
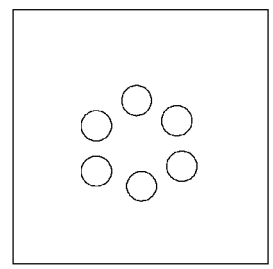
LP(8) = $LP_{31e}$
FIG. 5

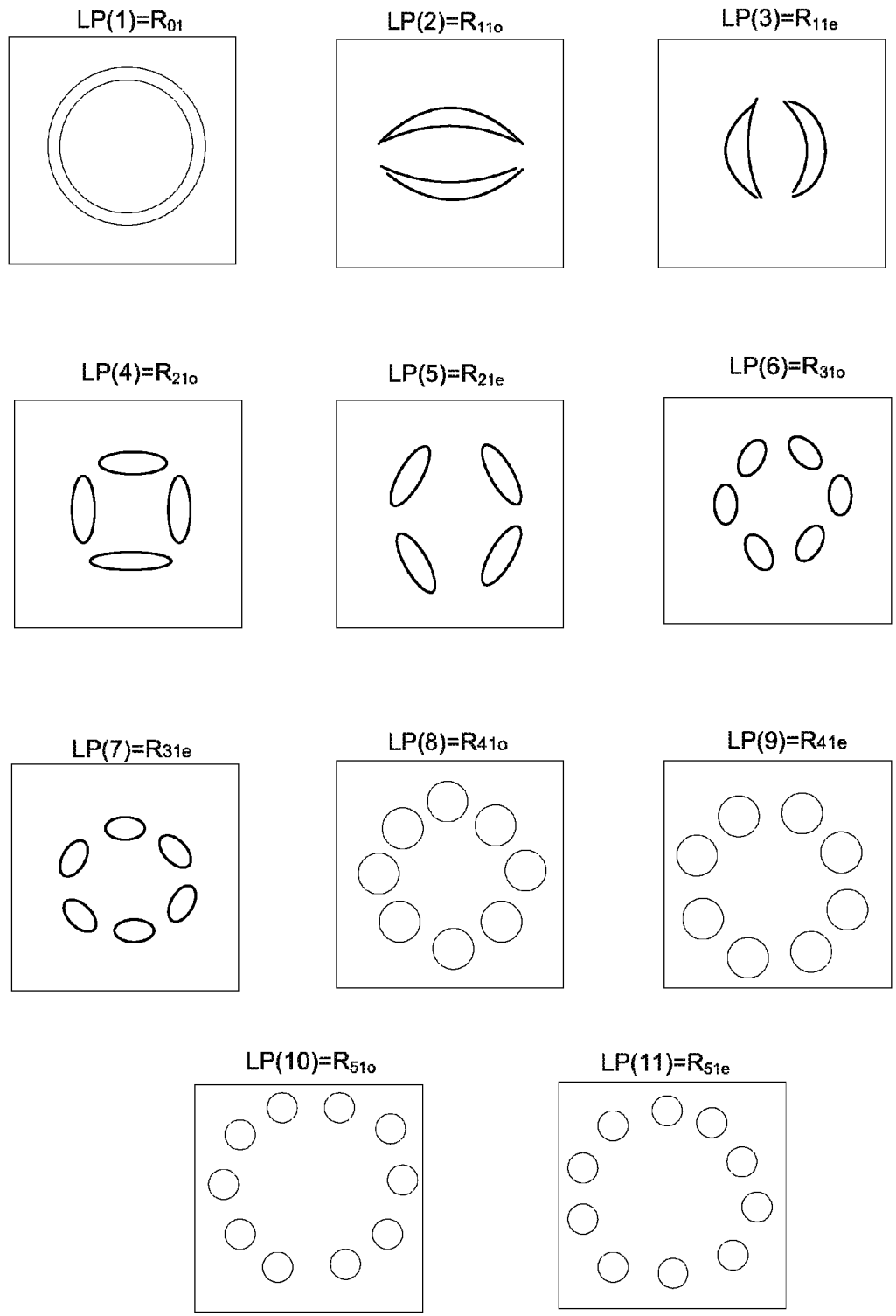

FIG. 7A
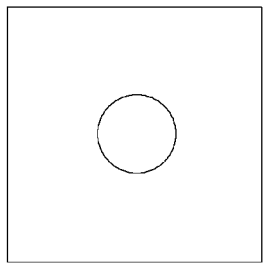
LP(1) = $LP_{01}$
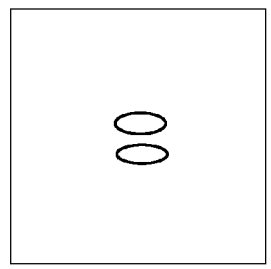
LP(2) = $LP_{11o}$
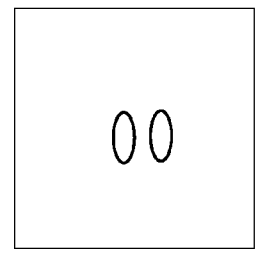
LP(3) = $LP_{11e}$
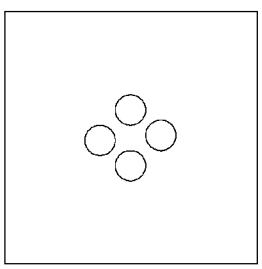
LP(4) = $LP_{21o}$
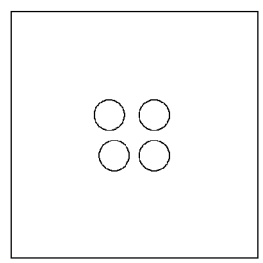
LP(5) = $LP_{21e}$
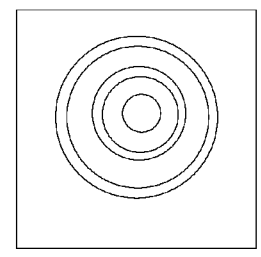
LP(6) = $(LP_{02} - R_{01})m1$
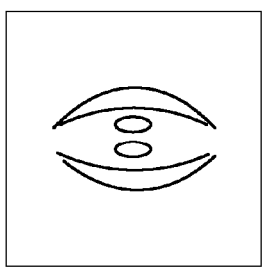
LP(7) = $R_{21o}$
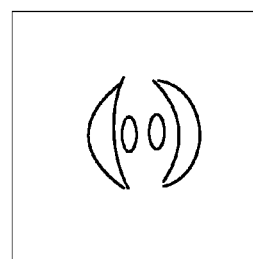
LP(8) = $R_{21e}$
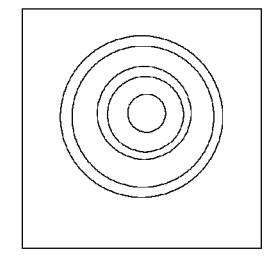
LP(9) = $(LP_{02} - R_{01})m2$ FIG. 7B
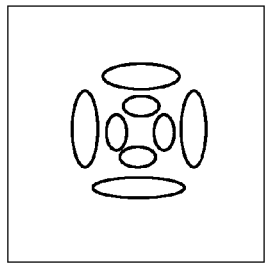
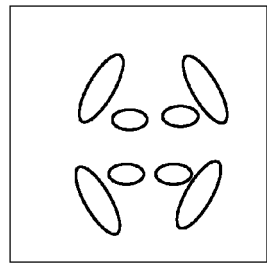
LP(5)=$R_{21e}$
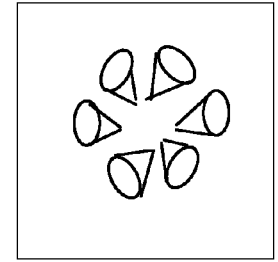
LP(6)=$R_{31o}$
LP(10) = $R_{21o}$
LP(11) = $R_{21e}$
LP(12) = $R_{31o}$
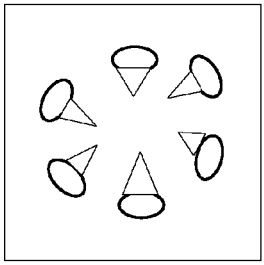
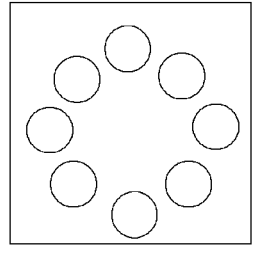
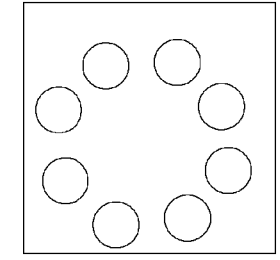
LP(9)=$R_{41e}$
LP(13) = $R_{31e}$
LP(14) = $R_{41o}$
LP(15) = $R_{41e}$
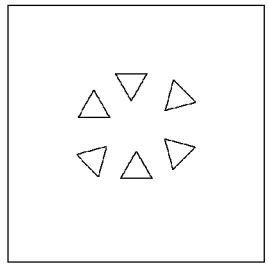
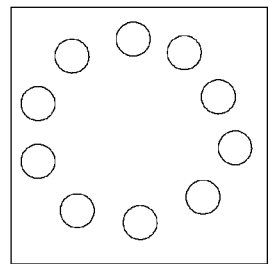
LP(9)=$R_{41e}$
LP(16) = $R_{31o}$
LP(17) = $R_{51o}$ FIG. 8
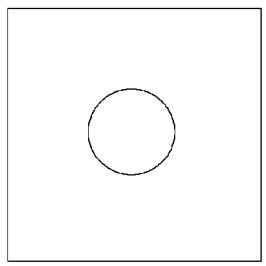
LP(1) = $LP_{01}$
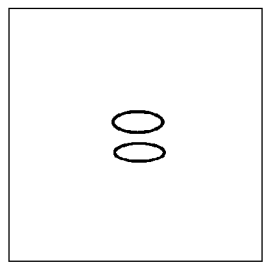
LP(2) = $LP_{11o}$
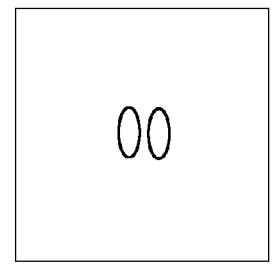
LP(3) = $LP_{11e}$
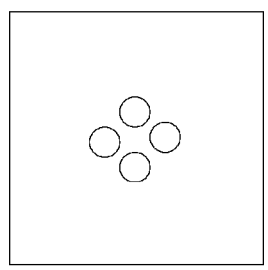
LP(4) = $LP_{21o}$
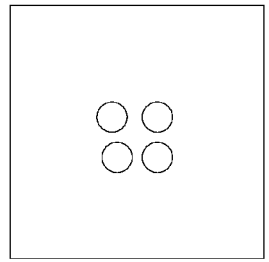
LP(5) = $LP(5)_{21e}$ FIG. 9A
LP(1) = $R_{21}$
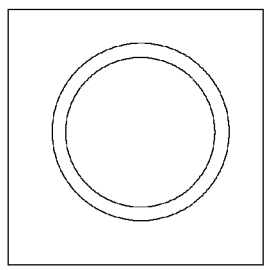
LP(2) = $R_{11o}$
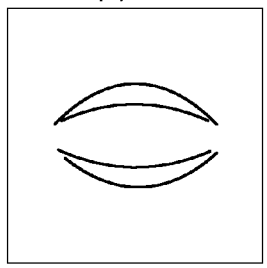
LP(3) = $R_{11e}$
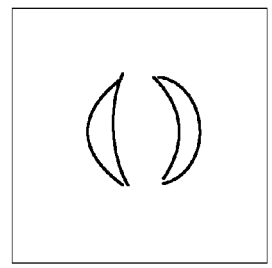
LP(4) = $R_{21o}$
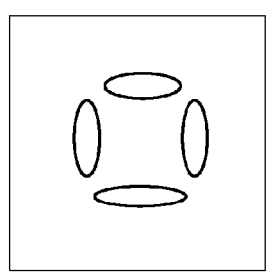
LP(5) = $R_{21e}$
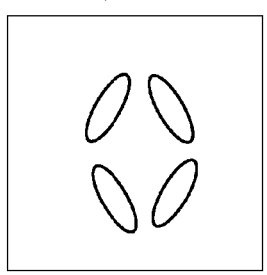
LP(6) = $R_{31o}$
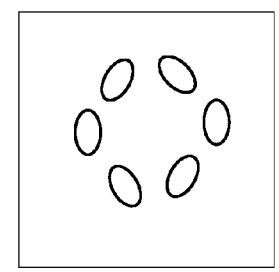
LP(6) = $R_{31e}$
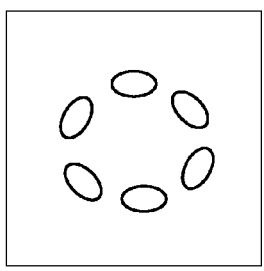
LP(8) = $R_{41o}$
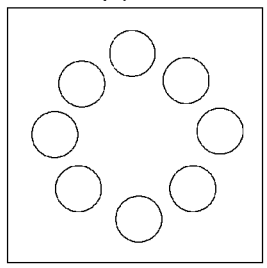
LP(9) = $R_{41e}$
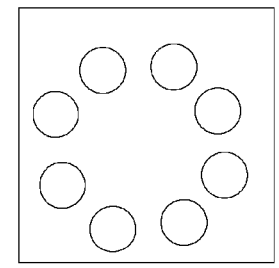

FIG. 9B
$LP(10) = R_{51o}$
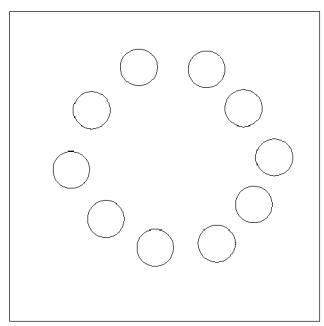
$LP(11) = R_{51e}$
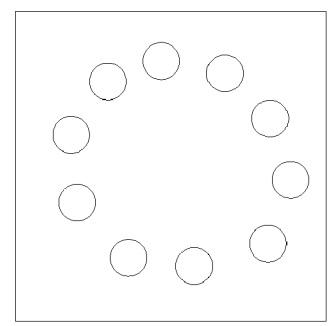
$LP(12) = R_{61o}$
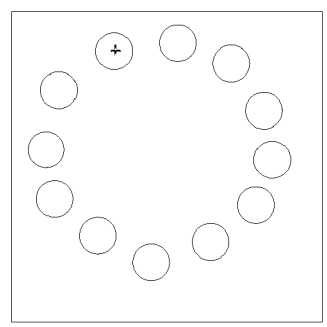
$LP(13) = R_{61e}$
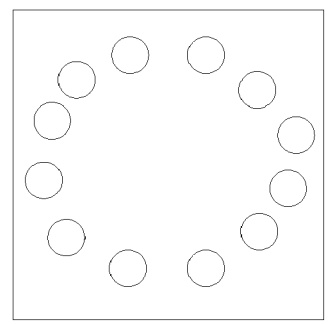

DOUBLE CLAD OPTICAL FIBER HAVING RING CORE SURROUNDING CORE FOR HIGH POWER OPERATION

CROSS-REFERENCE TO RELATED APPLICATION

This application is continuation of U.S. patent application Ser. No. 12/508,223 filed with the US Patent and Trademark office on Oct. 15, 2009.

FIELD OF THE INVENTION

The present invention relates to optical fibers and optical fiber apparatus, such as, for example, optical fiber amplifiers, lasers and amplified spontaneous emission (ASE) sources.

BACKGROUND OF THE DISCLOSURE

Lasers, amplifiers and other optical apparatus based on optical fiber can provide flexible, rugged and relatively simple sources of optical energy. Accordingly, in many applications such optical fiber apparatus can often have one or more advantages as compared to counterparts based on a gas medium (e.g., $CO_2$) or on a bulk solid-state medium (e.g., a Nd:YAG rod). For example, optical fiber lasers can have a smaller footprint, or can be more efficient, or can require less sophisticated cooling arrangements as compared to using a gas or bulk rod solid-state laser in a similar application. Often, however, it can be desirable to increase the output power of optical fiber apparatus, as certain gas and bulk solid-state lasers can readily produce high CW output powers or pulses of optical energy having high energy and/or high peak power.

Unfortunately, because of the high power density inherent in confining optical energy to the relatively small cross sectional area of an optical fiber, non-linear phenomena, such as Stimulated Raman Scattering (SRS) or Stimulated Brillouin Scattering (SBS), can severely limit scaling the output power of a fiber laser or amplifier to higher powers. Though these non-linear processes are complex, each can be addressed, at least in part, by reducing the power density in the core of the fiber. One way to reduce power density is to increase the diameter of the core of the fiber and/or reduce the numerical aperture (NA) of the core, such that the fiber has a larger mode field diameter (MFD). Reducing the power density in this manner can increase the power threshold for the onset of the undesirable non-linear phenomena.

This approach, however, is not without drawbacks. Fibers having larger core diameters can typically support higher order transverse modes (e.g., $LP_{11}$, $LP_{21}$, $LP_{02}$ etc.) in addition to the fundamental mode (e.g., $LP_{01}$). Such higher orders modes (HOMs) tend to degrade the quality of output optical energy provided by the fiber apparatus and hence raise the $M^2$ parameter (lower $M^2$ means better beam quality). In many applications a low $M^2$ is desired. Forestalling the onset of non-linear effects while also maintaining good beam quality can present a challenge to the designer of optical fiber apparatus.

Some approaches to this challenge are known in the art. For example, U.S. Pat. No. 6,496,301, issued on Dec. 17, 2002 to Koplow, Kliner and Goldberg, teaches bending a multimode fiber having a larger core to substantially attenuate, via increased bend loss, higher order modes such that a fiber amplifier provides gain in substantially a single mode. See also U.S. Pat. No. 7,424,193, issued on Sep. 9, 2008 to Alamantas Galvanauskas, which teaches a composite waveguide having a central core and at least one side core helically wound about the central core and in optical proximity to the central core. According to the '193 patent, higher order modes of the central core selectively couple to the helical side core and experience high loss such that the central core is effectively single-mode.

Existing techniques, however, are not necessarily entirely satisfactory in all circumstances. Accordingly, it is an object of the present invention to address one or more of the deficiencies or drawbacks of the prior art.

SUMMARY OF THE DISCLOSURE

In one aspect, the disclosure provides an optical fiber apparatus having a wavelength of operation at which the optical fiber apparatus propagates optical energy, where the optical fiber apparatus includes an optical fiber. The optical fiber can comprise a core; a pump cladding disposed about the core for receiving pump optical energy having a pump wavelength; and a second cladding disposed about the pump cladding for tending to confine pump optical energy to the pump cladding for propagation thereby. The core can comprise a rare earth material for providing optical energy having the wavelength of operation responsive to the optical fiber receiving the pump optical energy having the pump wavelength. The optical fiber can also include at least one ring core spaced from the core, wherein the ring core is defined by inner and outer diameters and comprises the cross sectional area therebetween, and the ring core further comprises an absorbing material for absorbing optical energy having the wavelength of operation. The optical fiber can be configured and arranged such that at the wavelength of operation the optical fiber comprises a fundamental mode that is primarily a mode of the core and at least one higher order mode (HOM) that is a mixed mode of a selected mode of the core and of selected mode of the ring core, wherein the selected mode of the core and the selected mode of the ring core are of the same azimuthal order. The mixed mode can be suppressed relative to the fundamental mode.

In additional aspects of the disclosure, the selected mode of the core can comprise the $LP_{02}$ mode of the core. The selected mode of the core can comprise the $LP_{11}$ mode of the core. The at least one HOM can comprise an intensity profile having a substantially central maxima or a substantially central minima. The at least one HOM can comprise at least two HOMs, one of which comprises a substantially central maxima and one of which comprises a substantially central minima. The pump cladding can consist or consist essentially of silica-based glass or pure silica. In one practice, the fiber does not include a microstructure for guiding optical energy. The rare earth material can comprise at least one of ytterbium, erbium, neodymium or thulium. The absorbing material can comprise at least one of samarium, praseodymium or terbium. The pump wavelength can comprise a wavelength of about 790 nm, and the absorbing material can comprise samarium. The pump wavelength can comprise, for example, a wavelength of about 793, about 915, about 940, about 976, or about 1567 nm. The pump wavelength can comprise a wavelength of about 1567 nm, and the absorbing material can comprise terbium. The wavelength of operation can comprise, for example, about 1060 nm, about 1550 nm, or about 2000 nm. In one example, the wavelength of operation can comprise a wavelength of operation of about 1060 nm and the absorbing material can comprise samarium or praseodymium. The rare earth material can comprise neodymium, and the absorbing material can comprise praseodymium. The at least one HOM can be suppressed such that the propagation loss of the at least one HOM is at least 10 times, in terms of dB per meter, higher than the propagation loss of the fundamental mode at the wavelength of operation. The ring core can comprise a silica-based glass. The silica-based glass can comprise a concentration of one or more of aluminum, fluorine, germanium or phosphorus, such as, for example, a concentration of aluminum and/or germanium.

In further aspects of the disclosure the optical fiber can comprise at least one longitudinally extending stress inducing region having a thermal coefficient of expansion that is different from material of the optical fiber disposed about the stress inducing region. The at least one stress inducing region for increase the birefringence of the optical fiber for providing polarization maintaining propagation of the fundamental mode. The optical fiber can extend along a longitudinal axis, and the optical fiber apparatus can comprise a second longitudinally extending optical fiber, wherein the second optical fiber is located alongside the first optical fiber such that pump optical energy propagated by the second optical fiber can couple to the pump cladding of the optical fiber for optically pumping the active material. A selected cladding can be disposed about the optical fiber and the second optical fiber.

In yet other aspects of the disclosure, the optical apparatus can be configured as a laser having a laser cavity defined by at least one optical fiber Bragg grating. The optical fiber apparatus can be a laser including a master oscillator power amplifier (MOPA) arrangement. The master oscillator need not comprise a fiber-based device, and can, for example comprise a semiconductor element, such as, for example, a laser diode or a solid state laser. The rare earth material can comprise thulium, and the absorbing material can comprise terbium.

According to yet a further aspect of the disclosure there is also taught a method of designing and/or fabricating an optical fiber having a mixed mode, which method can comprise the steps of: selecting a first mode of the optical fiber, such as a mode of a region of the optical fiber, that is to be mixed with another mode to form a mixed mode; determining the azimuthal order and effective refractive index of the selected first mode; selecting a mode of at least one other region of the fiber to have substantially the same effective refractive index and same azimuthal order as the first mode; and constructing and arranging the design of the fiber such the selected modes mix to form a mixed mode. "Substantially the same" in this context means close enough so that the selected modes will mix to form the mixed mode.

In more aspects of the disclosure, the optical fiber comprises at least one longitudinally extending stress inducing region having a thermal coefficient of expansion that is different from material of the optical fiber disposed about the stress inducing region. The stress inducing region can increase the birefringence of the optical fiber. The birefringence can be increased such that optical fiber comprises a polarization maintaining ("PM") optical fiber. The optical fiber can comprise a rare earth material for providing optical energy having the operating wavelength response to the optical apparatus receiving optical energy having a pump wavelength. The core of the optical fiber can comprise a diameter of at least 15 microns, a selected numerical aperture, and a V-number at the operating wavelength of greater than 3. The V-number can be greater than 5. The selected numerical aperture can be no greater than 0.10, or, alternatively, no less than 0.13 or no less than 0.15.

Certain terms used herein are now generally discussed. Others are discussed in the Specific Description and elsewhere below.

"Primarily a mode of the core" or "primarily a core mode" means that the mode (e.g., the fundamental mode) is not a mixed mode of the core and the ring core, where at least one HOM is a mixed mode of the core and the ring core spaced therefrom. In other words, the properties of the mode that is primarily a mode of the core are substantially determined by the core properties and the properties of the cladding, with the presence of the spaced ring core of which the at least one HOM is a mixed mode having little effect on the properties of the mode.

"Substantially higher propagation loss," as that term is used herein, means that the loss, as measured in dB per unit distance (e.g., per meter) is at least five (5) times higher at the wavelength of operation (e.g., at least 1.0 dB/meter if the baseline for comparison is 0.2 dB/meter). Such propagation loss can be determined on the basis of a test fiber that does not include a rare earth material, as such material may also absorb optical energy at the operating wavelength and may make comparisons difficult (e.g., the problem of measuring a relatively small difference between relatively large numbers). Stating that one mode is suppressed relative to another mode means that it has substantially higher propagation loss than the other mode. It is noted that the terms "index of refraction" and "refractive index" are at times used interchangeably herein. "Multimode" means not single mode, and includes what is sometimes referred to in the art as "few-moded." Typically a multimode fiber has a V-number of greater than 2.405 at its operating wavelength. "Material" includes material in the forms of ions (e.g., "comprising a concentration of erbium" includes comprising a concentration of $Er^{3+}$ ions).

Further advantages, novel features, and objects of the invention will become apparent from the following detailed description of non-limiting embodiments of the invention when considered in conjunction with the accompanying FIGURES, which are schematic and which are not necessarily drawn to scale. For purposes of clarity, not every component is labeled in every one of the following FIGURES, nor is every component of each embodiment of the invention shown where illustration is not considered necessary to allow those of ordinary skill in the art to understand the invention.

BRIEF DESCRIPTION OF THE DRAWINGS

FIG. 5 shows intensity distribution maps for the fundamental and higher order modes of another optical fiber, where only the core and cladding are considered in the analysis;

FIG. 6 shows intensity distribution maps for the fundamental and higher order modes corresponding to the optical fiber of FIG. 5, with the proviso that only a ring core and cladding are considered in the analysis;

FIG. 7A shows intensity distribution maps for the fundamental and higher order modes of the optical fiber considered in FIGS. 5 and 6, where all of the core, ring core and cladding are considered in the analysis;

FIG. 7B shows intensity distribution maps for additional higher order modes of the optical fiber considered in FIG. 7A;

FIG. 8 shows intensity distribution maps for fundamental and higher order modes of a additional optical fiber, with the proviso that only the core and cladding are considered in the analysis;

FIG. 9A shows intensity distribution maps for the fundamental and higher order modes corresponding to the optical fiber of FIG. 8, with the proviso that only a ring core and cladding are considered in the analysis;

FIG. 9B shows intensity distribution maps for additional higher order modes of the optical fiber of FIG. 9A;

SPECIFIC DESCRIPTION

Figure 1:
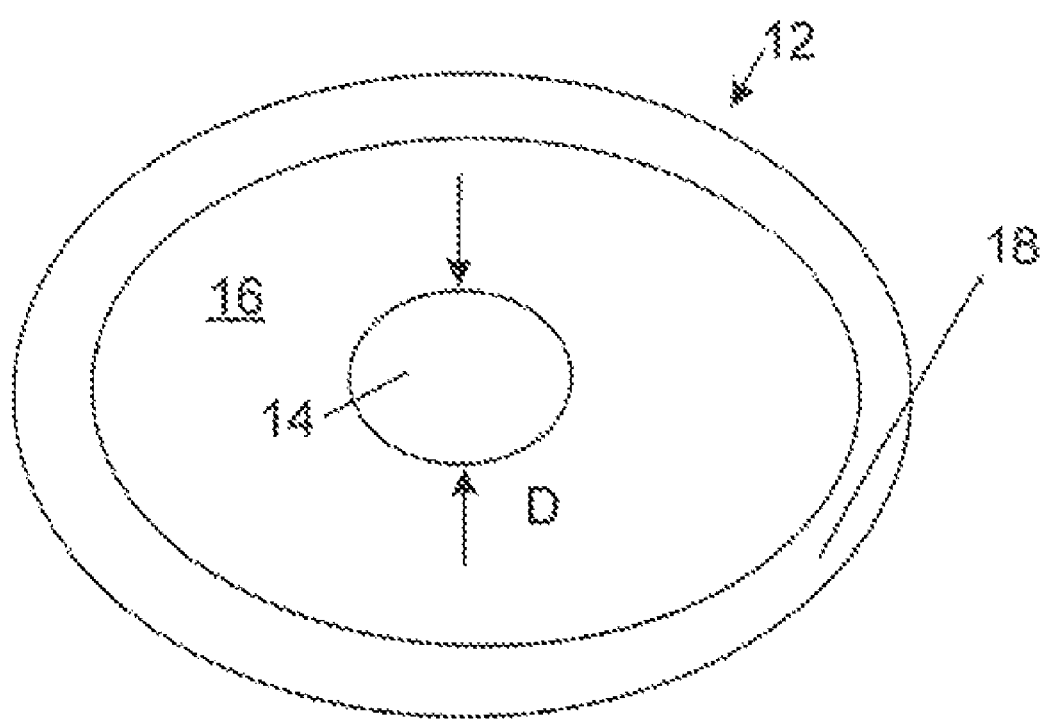
FIG. 1 schematically illustrates a cross section of an optical fiber, taken perpendicular to the longitudinal axis along which the fiber extends.

FIG. 1 schematically illustrates a cross section of an optical fiber 12, taken perpendicular to the longitudinal axis along which the fiber 12 extends. The optical fiber 12 of FIG. 1 can include a core 14 and a cladding 16 disposed about the core 14. Typically the cladding 16 contactingly surrounds the core 12 and tends to confine optical energy propagated by the optical fiber 12 to the core 14 for guidance thereby, such as by via the phenomenon of total internal reflection. The optical fiber 12 can include at least one additional region 18 disposed about the cladding 16. The region 18 shown in FIG. 1 can represent a second cladding disposed about the cladding 16 for tending to confine optical energy, such as pump optical energy, to the cladding 16 for guidance thereby. Such a fiber is referred to in the art as a "cladding pumped" or "double-clad" optical fiber, and the cladding 16 can be referred to as a "pump cladding." The second cladding can comprise, for example, a glass or a fluorinated low index polymer coating applied and cured during draw of the optical fiber 12. Alternatively, the region 18 can represent a high index polymer protective region, typically comprising an outer higher modulus layer disposed over an inner lower modulus layer. One or both of the layers can be applied as coatings to the optical fiber as part of the draw process. Variations of the foregoing are of course possible. For example, the region 18 can comprise a glass second cladding for tending to confine pump light to the cladding 16, and the region 18 can in turn have disposed thereabout a polymer protective region having one or more layers.

The core 14 can comprise an active material for providing optical energy (e.g., via the process of stimulated emission) responsive to the optical fiber 12 receiving pump optical energy having a pump wavelength. The active material can comprise a rare earth material, such as, for example, one or more of erbium, ytterbium, neodymium or thulium (e.g., a concentration of Er, Yb, Nd or Th ions).

The core 14 is typically multimode, and has a diameter D that is larger than a standard single mode core (e.g., a 5 micron diameter core) to provide a fundamental mode having an increased mode field diameter (MFD). The increased MFD can reduce power density and hence increase the power threshold for the onset of non-linear phenomena. The exact MFD can depend on other factors, such as refractive index profile, of course, but for many standard designs a larger diameter core will typically having a fundamental mode have a larger MFD.

Figure 2:
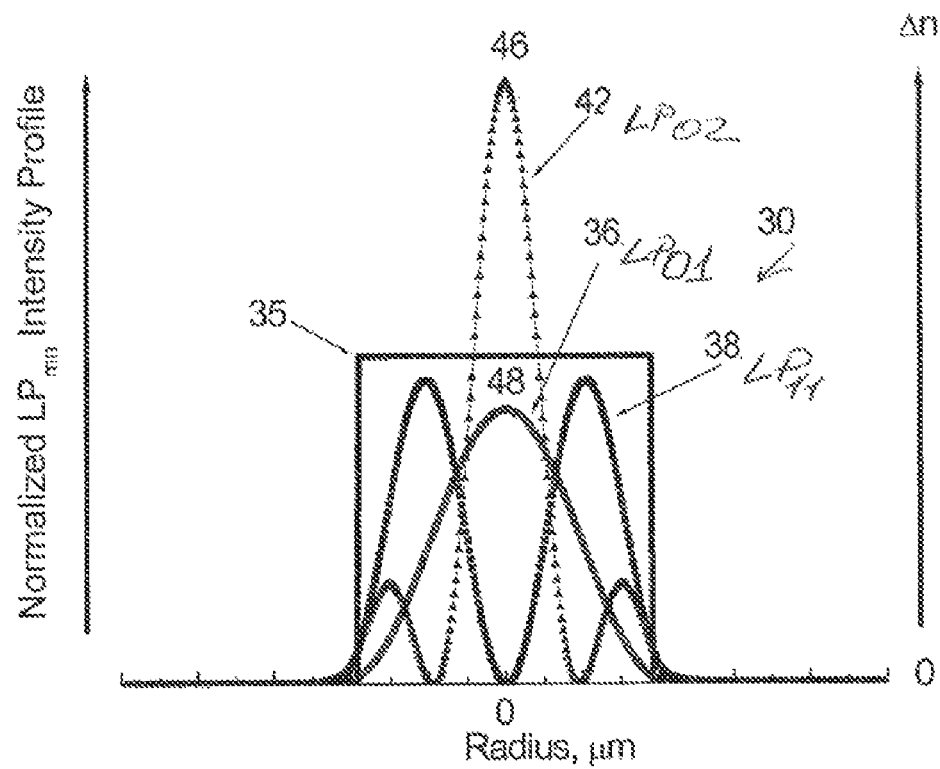
FIG. 2 is an idealized plot of a possible refractive index profile for the core and cladding of the fiber of FIG. 1 as well as corresponding normalized intensity profiles for the fundamental and selected higher order modes (HOMs)

FIG. 2 includes a plot of one possible refractive index profile 30 for the core 14 and cladding 16 of the fiber 12 of FIG. 1, and also includes plots of normalized intensity profiles for the fundamental and selected HOMs. (Intensities are normalized for each mode by setting the integral over $r \cdot dr \cdot d\phi$ to 1.) As shown in FIG. 2, the optical fiber 12 can support, in addition to the fundamental mode $LP_{01}$ indicated by reference numeral 36 with a central maxima 48, multiple HOMs, such as, among others, the $LP_{11}$ mode indicated by reference numeral 38 and the $LP_{02}$ mode, indicated by reference numeral 42. Note that whereas certain of the HOMs, such as the $LP_{11}$ mode 38 and, has a central minima or null, the $LP_{02}$ mode comprises an intensity profile that does not include such a minima or null, and rather is substantially non-zero at its center, as indicated in FIG. 2 by reference numeral 46. A substantially central maxima (which is typically absolute, not just local) is characteristic of modes of zero azimuthal order, at least for lower order modes. Azimuthal order refers to the value of the first subscript in the mode designation.

The HOMs, if excited, can degrade beam quality, as noted above. In many instances the $LP_{02}$ mode is the most problematic, because it shares with the fundamental mode a intensity profile that has a substantially central maxima such that excitation of the fundamental mode, such as by a simple splice to single mode fiber, could be very likely to excite the $LP_{02}$ mode. In other instances, the $LP_{11}$ mode can be problematic.

Figure 3:
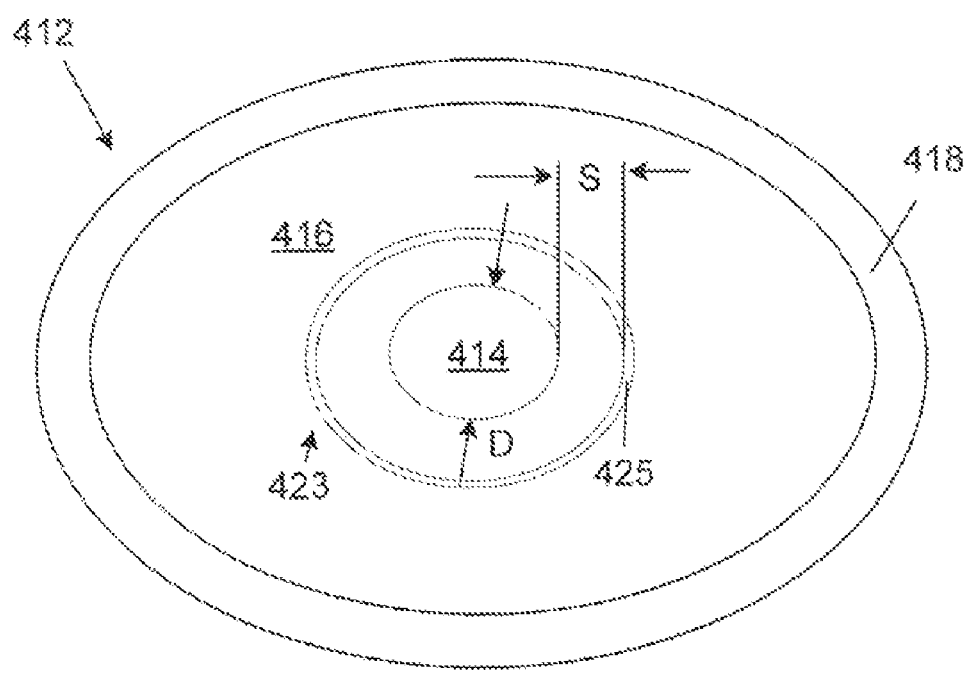
FIG. 3 schematically illustrates a cross section of an optical fiber according to the disclosure having a core and at least one region spaced from the core.

Consider now the optical fiber 412 of FIG. 3, which can be substantially similar to optical fiber 12 of FIG. 1, and hence can include some or all of the structural features thereof noted above. The optical fiber 412 includes a core 414 with a diameter D, a cladding 416 disposed about the core 414, and, optionally, a second region 418 disposed about the cladding 416. However, in addition to the features of the optical fiber 12 of FIG. 1, the optical fiber 412 can further include at least one region 423 spaced from the core 414. In the embodiment shown in FIG. 4 the at least one region 423 comprises a ring core 425. The at least one region 423 can include an absorbing material for absorbing optical energy having a selected wavelength, such as, for example, the wavelength of operation of the optical fiber 412. The absorbing material is preferably of low absorption at the pump wavelength.

Figure 4:
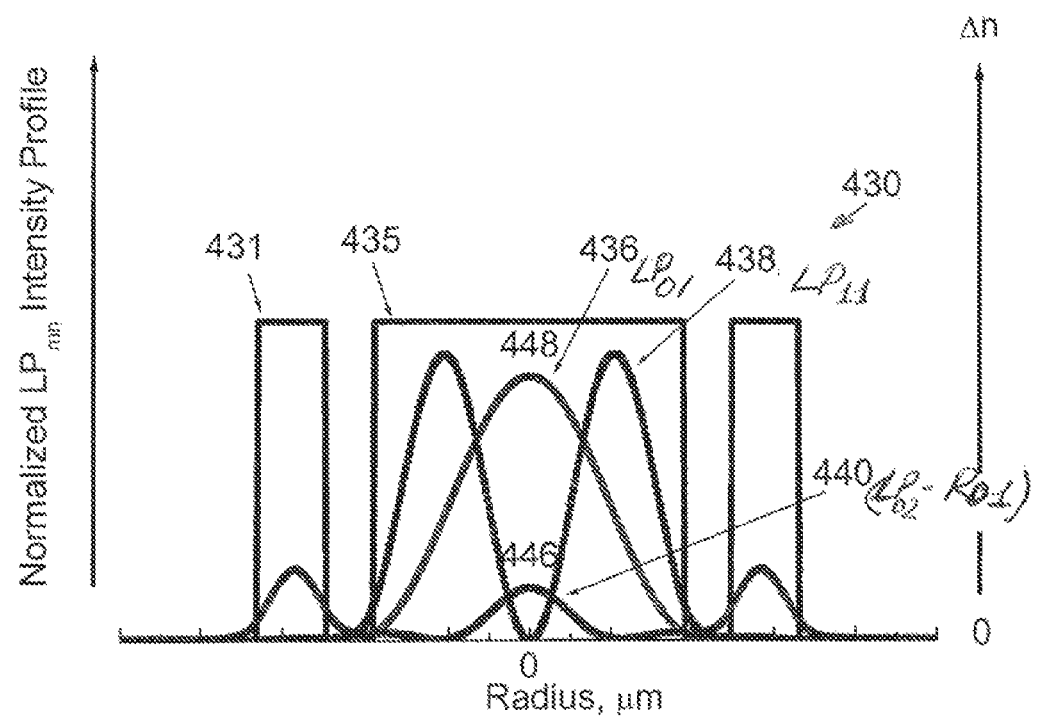
FIG. 4 is an idealized plot of a possible refractive index profile for the fiber of FIG. 3 as well as corresponding normalized intensity profiles for the fundamental and selected HOMs.

FIG. 4 plots one possible refractive index profile 430 for the optical fiber 412 of FIG. 3 and normalized intensity profiles for the fundamental and selected HOMs. The refractive index profile 430 includes an inner section 435 corresponding to the core 414 and outer sections 431 corresponding to the ring core 425. Sections of the refractive index profile between the section 435 (corresponding to the core) and the sections 431 (representative of the ring core 425) correspond to the cladding 416, as do sections outward of the sections 431. Cladding sections are not indicated by reference numerals in FIG. 4. Note that refractive profile section 435 and sections 431 can have substantially the same index difference with respect to the cladding.

Reference numerals 436 and 438 indicate respective fundamental mode $LP_{01}$ and HOM $LP_{11}$, all of which are at least relatively similar to, respectively, the $LP_{01}$ and $LP_{11}$ modes of FIG. 4 (indicated in FIG. 2 by reference numerals 36 and 38, respectively). Note that FIGS. 2 and 4 differ considerably in that the intensity profile of the $LP_{02}$ mode of FIG. 2, which had a substantially non-zero central portion 46 of FIG. 2, is largely absent from FIG. 4. Present are the intensity profile 448 of the fundamental mode $LP_{01}$ that is non-zero at substantially the center of the fiber, in addition to the substantially centrally non-zero intensity profile 446 of the HOM $LP_{02}$, but the peak of the intensity profile 446 is reduced considerably in comparison with the $LP_{02}$ intensity profile 46. The $LP_{02}$ mode of FIG. 2 has been "converted" to a mixed mode 440 of the core 414 and the at least one region 423 of FIG. 3 (or in any event the $LP_{02}$ seems to have disappeared and the mixed mode has appeared). Because the mixed mode has appropriate intensity in the ring core 425 of FIG. 3, it is substantially attenuated, including the intensity portion of the mixed mode present in the core 414, by the absorbing material comprised by the ring core 425. The fundamental mode $LP_{01}$, however, which is not a mixed mode, is largely unaffected, or at least any increase in attenuation thereof is easily accommodated and/or not overly detrimental in many practical applications.

If the optical fiber apparatus comprises a rare earth material that is to be pumped, it can be desirable to select an absorbing material that tends not to absorb the pump optical energy. Absorbing materials useful with typical rare earths include samarium, praseodymium or terbium. $Sm^{3+}$ and $Pr^{3+}$ ions, which have strong absorption around 1064 nm and 1030 nm, respectively, can be useful when the optical fiber apparatus include a rare earth material, such as ytterbium, providing light at around 1060 nm. Ytterbium can be pumped, for example, at 915, 940 or 975 nm, and, as one example, samarium and praseodymium have low absorption at 975 nm. Samarium can also be particularly useful when the rare earth material comprises neodymium or ytterbium and erbium. Terbium can be particularly useful when, for example, pumping the rare earth material thulium at 1576 nm and samarium when pumping at 790 nm. Thulium can provide optical energy at about 2000 nm, as is known in the art. The absorbing material can have concentration of, for example, about 500 ppm, about 1000 ppm, about 1500 ppm about 2000 ppm or greater than about 2000 ppm.

The ring core can comprise a silica-based glass. The silica-based glass can comprise, for example, one or more of a concentration of aluminum, phosphorus, germanium or fluorine. In one example, the ring core comprises a concentration of phosphorus and fluorine, such as in a silica based glass; in another example, the ring core can comprise a concentration of aluminum and can include, for example, a concentration of germanium. In one example, a silica based glass can comprise the aluminum and germanium concentrations, and the absorbing material can comprise samarium. The concentration ranges specified above for the absorbing material can be useful for the Al, Ge, P and F materials noted above.

Modeling indicates the attenuation of the mixed mode can be at least between one and two orders of magnitude greater that than of the fundamental mode, where the attenuation is specified in terms of dB/meter (e.g., tenths of a dB/meter for $LP_{01}$ compared to tens of dB/meter for the mixed mode to which the $LP_{02}$ mode is converted). See Table I below.

TABLE I

Modeled Losses of Fundamental and
HOMs - Optical Fiber of FIGS. 3 & 4

| Mode | Modeled losses at 1060 nm (dB/m), ring core doped with 1000 ppm Sm |
|---|---|
| $LP_{01}$ (fundamental) | 0.1586 |
| $LP_{11}$ | 1.3708 |
| $LP_{21}$ (converted to mixed mode) | — |
| LP(3) = (mixed core/ring core mode 446) | 74.8062 |
| LP(4) = (mixed core/ring core mode 440) | 38.0906 |

(Core diameter = 19 μm, Δn = 0.006, ring = 12.5/16.5 μm, Δn = 0.006)

Thus the optical fiber of FIGS. 3 and 4 can provide fiber having the benefit of fundamental mode that has an increased MFD, which reduces the core power density and allows higher power transmission before the onset of non linear phenomena. The optical fiber 412 can be configured and arranged, such as by, for example, selecting one or more of the composition, geometrical shape, location and refractive index profiles of the core 414 and/or ring core 425, such that at the desired wavelength of operation the optical fiber 412 supports a fundamental mode and at least one HOM that is a mixed mode of the core and ring core. The at least one HOM can be attenuated, while the fundamental mode can remain primarily a mode of the core 414.

Often obtaining a higher power laser or optical amplifier means providing a higher power of pump light to the optical fiber 412, and the optical fiber 412 should be able to handle the high power without the fiber degrading, such as by photo darkening. As noted above in the discussion regarding FIG. 1, the cladding 416 can comprise glass, such as, for example, a silica-based glass. It is often desirable that the cladding 416 consist of or consist essentially of glass, such as a silica based glass or pure silica glass, to help ensure that the optical fiber 412 can handle high power levels of light having the pump wavelength, especially when the optical fiber 412 comprises a cladding pumped fiber. The cladding 416 can, in certain aspects of the disclosure, be substantially homogenous and (except for the presence of the at least one region that effects mixed modes and, if desired, stress inducing regions) and hence not be considered as including a "microstructure" for guiding optical energy.

With reference to FIGS. 1-4 above, the modeled fiber has a core 14 having a diameter D of 19 microns having a step index profile 30, with the raised section corresponding to the refractive index of the core 14 and having an index difference Δn of about 0.006 with respect to the cladding 16. Calculations were performed for an operating wavelength of about 1060 nm. The ring core 425 comprised a thickness T of about 4 microns and is spaced from the core 414 by a spacing S of about 3 microns (inner radius of ring core=12.5 microns, outer radius of ring core=16.5 microns). The ring core 425 was considered as doped with about 1000 ppm of an absorbing material (samarium). The index difference or Δn between the ring sections 431 (or more generally between the at least one region) and the cladding was also considered as about 0.006, but more generally need not be equal to the Δ between the core 425 and the cladding. The Δn between the ring section [435] and cladding can be less than, substantially equal to, or greater than the Δn between the core section 425 and the cladding.

To further facilitate understanding of the disclosure, additional details regarding optical fibers having one or more mixed modes as well one or more modes that are primarily of the core or that at the least one region are provided below. To illustrate the versatility of the disclosure, different fiber designs are considered.

Consider a fiber generally as shown in FIGS. 3 and 4 and having a core having a diameter of about 21 μm and a ring core having an inner radius of about 16 μm and an outer radius of about 21 μm. The fiber has a step refractive profile generally as shown in FIG. 4 with a Δn for the central core of about 0.0025. The index of refraction of the cladding is about 1.44968 at a wavelength of about 1060 nm. The core, considered individually, has a numerical aperture (NA) of about 0.085 and V-number at 1060 nm of about 5.30.

The fiber can be analyzed as if the ring core is absent, that is, replaced by the cladding material. This is referred to herein as an "individual core" analysis and the modes as "core modes." However, although the ring core is not present, the overlap integral between the normalized mode intensity and the portion of the fiber the ring core would occupy if present can be calculated. See Table II below.

TABLE II

Waveguide modes in fiber with core diameter of 21.0 μm & Δn = 0.0025.

| LP mode | Mode Type | Mode Effective refractive index | Mode overlap integral with core | Mode overlap integral with ring |
|---|---|---|---|---|
| 1 | $LP_{01}$ | 1.45182 | 0.9733 | 0.00040 |
| 2 | $LP_{11o}$ | 1.45129 | — | — |
| 3 | $LP_{11e}$ | 1.45129 | 0.9267 | 0.00179 |
| 4 | $LP_{21o}$ | 1.45061 | 0.8529 | 0.00693 |
| 5 | $LP_{21e}$ | 1.45061 | — | — |
| 6 | $LP_{02}$ | 1.45040 | 0.8041 | 0.01586 |
| 7 | $LP_{31o}$ | 1.44982 | 0.7165 | 0.03404 |
| 8 | $LP_{31e}$ | 1.44982 | — | — |

$n_{clad}$ = 1.44968 at 1060 nm. NA = 0.085. V = 5.30.

Modes are ordered by their effective index value, with higher order modes having lower effective indices. Modes having an effective index greater than that of the cladding are considered guided. Odd and even degenerate modes are indicated by "o" and "e" subscripts, respectively. Only one calculation is made where values are expected to be the same for the odd and even modes. FIG. 5 shows two dimensional intensity distribution maps for the modes of Table II.

The optical fiber can also be analyzed as if the ring core is present and the core is absent. Table III presents the results of such an analysis, and FIG. 6 shows intensity maps for the modes of Table III. This analysis is referred to herein as "individual ring core" analysis and the modes as "ring core" or "ring" modes.

TABLE III

Waveguide modes in fiber with ring $r_1/r_2$ = 16.0/21.0 μm & Δn = 0.00154.

| LP mode | Mode Type | Mode effective refractive index | Mode overlap integral mode with core | Mode overlap integral with ring |
|---|---|---|---|---|
| 1 | $R_{01}$ | 1.45041 | 0.00137 | 0.67097 |
| 2 | $R_{11o}$ | 1.45037 | — | — |
| 3 | $R_{11e}$ | 1.45037 | 0.00065 | 0.67395 |
| 4 | $R_{21o}$ | 1.45029 | 0.00023 | 0.67764 |
| 5 | $R_{21e}$ | 1.45028 | — | — |
| 6 | $R_{31o}$ | 1.45013 | 0.00062 | 0.67857 |
| 7 | $R_{31e}$ | 1.45013 | — | — |
| 8 | $R_{41o}$ | 1.44994 | 0.00002 | 0.67354 |
| 9 | $R_{41e}$ | 1.44993 | — | — |
| 10 | $R_{51o}$ | 1.44969 | 0.00000 | 0.65995 |
| 11 | $R_{51e}$ | 1.44968 | — | — |

$n_{clad}$ = 1.44968 at 1060 nm.

Table IV below tabulates modeling analysis of the actual optical fiber, that is, where the central and the ring core are both present. FIG. 7 shows two dimensional intensity distribution maps for the modes of the actual fiber analysis of Table IV.

TABLE IV

Waveguide modes in fiber with core diameter of 21.0 μm & Δn = 0.0025 and ring $r_1/r_2$ = 16.0/21.0 μm & Δn = 0.00154.

| LP mode | Mode Type | Mode Effective refractive index | Mode overlap integral with core | Mode overlap integral with ring |
|---|---|---|---|---|
| 1 | $LP_{01}$ | 1.45182 | 0.97237 | 0.00045 |
| 2 | $LP_{11o}$ | 1.45129 | — | — |
| 3 | $LP_{11e}$ | 1.45129 | 0.92049 | 0.00343 |
| 4 | $LP_{21o}$ | 1.45063 | 0.77994 | 0.04831 |
| 5 | $LP_{21e}$ | 1.45063 | — | — |
| 6 | $(LP_{02}-R_{01})_{m1}$ | 1.45051 | 0.38302 | 0.33125 |
| 7 | $R_{11o}$ | 1.45037 | — | — |
| 8 | $R_{11e}$ | 1.45037 | 0.01737 | 0.66734 |
| 9 | $(LP_{02}-R_{01})_{m2}$ | 1.45026 | 0.47590 | 0.34334 |
| 10 | $R_{21o}$ | 1.45025 | 0.00664 | 0.64030 |
| 11 | $R_{21e}$ | 1.45024 | — | — |
| 12 | $R_{31o}$ | 1.45016 | 0.06734 | 0.60407 |
| 13 | $R_{31e}$ | 1.45016 | — | — |
| 14 | $R_{41o}$ | 1.44995 | 0.00741 | 0.66361 |
| 15 | $R_{41e}$ | 1.44993 | — | — |
| 16 | $LP_{31o}$ | 1.44976 | 0.68473 | 0.08991 |
| 17 | $R_{51e}$ | 1.44968 | 0.00234 | 0.65680 |

$n_{clad}$ = 1.44968 at 1060 nm.

This analysis is referred to as an "actual fiber" analysis, and the modes as "actual fiber modes" or "actual modes."

The data presented herein in the various FIGURES and Tables is now discussed to demonstrate the approach used to classify modes as mixed or primarily of a region and to determine how to identify the modes that have mixed to form a particular mixed mode. To better demonstrate the modal intensity distribution maps, the analysis used to generate the maps of FIGS. 5-10 does not include the effect of the absorbing material, such as the absorbing material comprised by the ring 425 of FIG. 3.

The following criteria represents one way to establish that a mode identified in an actual fiber analysis is a mixed mode wherein particular modes identified in individual analyses have mixed: (1) the intensity map for the actual fiber mixed mode appears to be a combination of the individual intensity maps of the individual modes that are mixing to form the mixed mode; (2) the modes that are mixing are of the same azimuthal order; and (3) whereas the modes considered individually might not have intensities in the core and ring core that are significantly of the same order of magnitude (as can be indicated by the overlap integrations being generally the same), for the mixed mode intensities are significantly of the same order. Finally, to facilitate mixing, (4) the individual modes of the core and of the at least one region should have effective indices that are not too disparate. An exact match of effective indices is not understood to be required, however.

With reference to Tables II and III, note that the effective refractive index of the $LP_{02}$ core mode (1.45040) is substantially the same as that of the effective refractive index of the $R_{01}$ ring core mode (1.54041). (Note that the difference, $1 \times 10^{-5}$, is certainly considered narrower than the full ambit of "substantially the same.") Furthermore, both the modes are of the same (zero in this case) azimuthal order. In addition, whereas FIGS. 7A and 7B include intensity maps that bear a strong resemblance to each intensity maps for individual core modes or intensity maps for individual ring modes, FIGS. 7A and 7B do not include an analog to the $LP_{02}$ core mode. For example, the intensity maps for modes LP(1)-LP(5) of the actual fiber analysis of FIG. 7A each bear a strong resemblance to the intensity maps for the modes LP(1)-LP(5) of the core analysis of FIG. 5. The LP(6) mode of the actual analysis of FIG. 7A, however, does not resemble any one core mode intensity map of FIG. 5 or ring core mode intensity map of FIG. 6, but rather appears to be a combination of the $LP_{02}$ core mode (LP(6) of the individual core analysis of FIG. 5) and the $R_{01}$ (LP(1) of the individual ring core analysis of FIG. 6).

The overlap integrals of Tables II-IV confirm that the LP(6) actual fiber mode is a mixed mode of the $LP_{02}$ core mode and the $R_{01}$ ring core mode. Whereas the overlap for the $R_{01}$ ring core mode with the ring core is approximately 500 times the overlap with the core, and the overlap of $LP_0$/core with the core is approximately 50 times the overlap with the ring core, the ratio of the larger overlap value to the smaller overlap value for the LP(6) actual mode is now reduced to 1.1563, indicating a close to even distribution between the core and ring core.

Based on a similar analysis for the LP(9) actual mode, it is therefore concluded that the $LP_N$ core mode and $R_{01}$ ring mode mix to form two mixed modes—the LP(6) and LP(9) modes of Table IV and FIG. 7A. Inclusion of absorbing material in the ring core should suppress these mixed modes, yet leave the LP(1), or $LP_{01}$, fundamental actual fiber mode far less attenuated, as it primarily a mode of the core (as are the core modes LP(2)-LP(5), which modes include modes corresponding to the $LP_{11}$ and $LP_{21}$ odd and even modes of the core).

Note that certain actual HOMs can have intensity profiles that appear to be a mixture core and cladding modes, yet that are not considered to be mixed modes. For example, LP(10) of FIG. 7B appears to be a combination of the LP(4), or $R_{21o}$, ring core mode of FIG. 6 and the LP(4), or $LP_{21o}$, core mode of FIG. 5. However, the effective refractive indices of the $R_{21o}$ mode (1.45029) is not that close to that of the $LP_{21o}$ mode (1.45069), and most importantly the values for the overlap integrals for the LP(10) actual fiber HOM differ by a factor of about 100 (see Table IV), with the vast majority of the intensity overlapping with the ring core. Accordingly, although the azimuthal order of the $R_{21o}$ and $LP_{21o}$ modes is the same, and both are of the odd orientation, they are not considered to be mixing to form a mixed mode, despite the LP(10) actual fiber intensity distribution appearing to be a direct combination of $R_{21o}$ ring core mode and the $LP_{21o}$ cladding mode. The LP(10) actual fiber mode appears to be primarily a mode of the ring core, despite the added features of intensity map. A mode such at the LP(10) is referred to herein as a "composite mode," because of the appearance of the intensity map, but not a mixed mode.

Accordingly, one approach to mixing a selected mode of region, for example, a selected mode of the core (perhaps so that it can be suppressed) is to design the ring core such that a ring mode of the same azimuthal order as the targeted core mode has a similar effective index to that of the targeted core mode. Analysis of the actual fiber data can confirm the existence of the mixed mode. Iterations can be performed as necessary, varying one or more of the geometry of the core and ring cores, spacing therebetween, refractive index profiles, etc. to arrive at the design where the desired modes mix to form a desired mixed mode. The effect of an absorbing material comprised in one of the regions (e.g., the core or ring core) can be ascertained to establish suppression of a mode or to further confirm that a mode is a mixed mode or primary mode. For example, absorbing material in the ring core should affect mixed modes and modes that are primarily of the ring core, but typically do not substantially affect modes that are primarily modes of the core.

In the above examples, the $LP_{02}$ core mode is mixed with ring core modes to form an actual mode, but no attempt was made to mix the $LP_{11}$ core modes. Data demonstrating an optical fiber wherein the $LP_{11}$ core modes mix with ring core modes to form mixed modes are presented in Tables V-VII and FIGS. 8-10. The procedure follows that described above in conjunction with Tables II-IV and FIGS. 5-7B. In this example the optical fiber has a core having a diameter of about 14.0 μm and Δn of about 0.003 with respect to the cladding, which, as in the previous example, has an index of refraction at 1060 nm of 1.44968. The core, considered alone, has a numerical aperture (NA) of about 0.093 and a V-number of about 3.87. The optical fiber includes a ring core having an inner radius of about 14 μm and an outer radius of about 20 μm, and a Δn with respect to the cladding of about 0.00215. Again, note that the Δn of the core and ring core differ.

Figure 10:
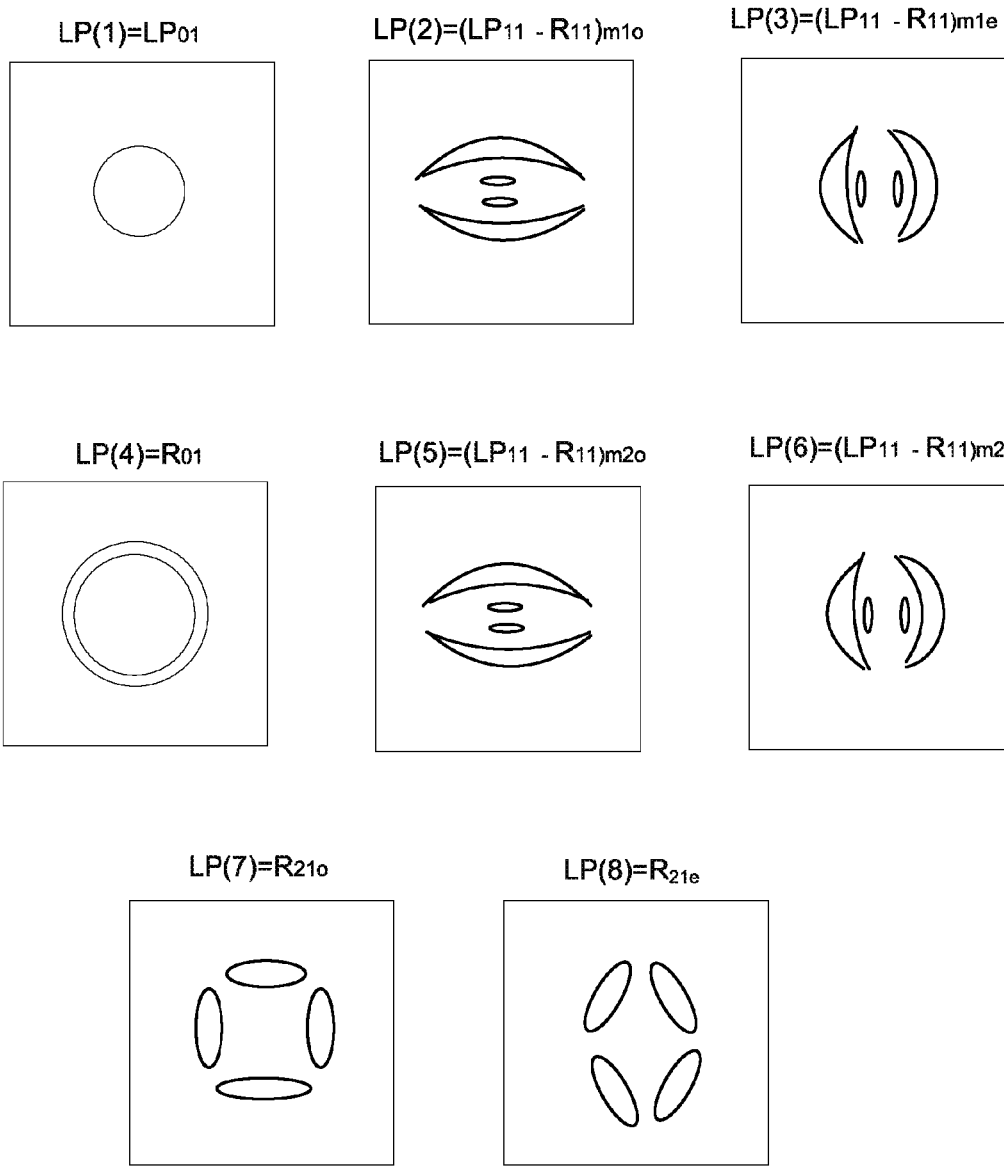
FIG. 10 shows intensity distribution maps for the fundamental and higher order modes of the optical fiber considered in FIGS. 8 and 9, where all of the core, ring core and cladding are considered in the analysis.

Table V presents the individual core analysis, and FIG. 8 shows the corresponding intensity maps for the modes presented in Table V; Table VI presents the ring core considered individually, and FIG. 9 shows the corresponding intensity maps for the modes of table VI; and Table VII presents actual fiber mode data, with FIG. 10 presenting the intensity distribution maps for actual fiber modes of the Table VII.

TABLE V

Waveguide modes in fiber with core diameter of 14.0 μm & Δn = 0.003.

| LP mode | Mode Type | Mode Effective refractive index | Mode overlap integral with core | Mode overlap integral with ring |
|---|---|---|---|---|
| 1 | $LP_{01}$ | 1.45198 | 0.94157 | 0.00007 |
| 2 | $LP_{11o}$ | 1.45096 | — | — |
| 3 | $LP_{11e}$ | 1.45096 | 0.83074 | 0.00098 |
| 4 | $LP_{21o}$ | 1.44978 | 0.58417 | 0.03368 |
| 5 | $LP_{21e}$ | 1.44977 | — | — |

$n_{clad}$ = 1.44968 at 1060 nm. NA = 0.093. V = 3.87.

TABLE VI

Waveguide modes in fiber with ring $r_1/r_2$ = 14.0/20.0 μm & Δn = 0.00215.

| LP mode | Mode Type | Mode Effective refractive index | Mode overlap integral with core | Mode overlap integral with ring |
|---|---|---|---|---|
| 1 | $R_{01}$ | 1.45100 | 0.00070 | 0.80418 |
| 2 | $R_{11o}$ | 1.45096 | — | — |
| 3 | $R_{11e}$ | 1.45096 | 0.00041 | 0.80945 |
| 4 | $R_{21o}$ | 1.45086 | 0.00019 | 0.81169 |
| 5 | $R_{21e}$ | 1.45085 | — | — |
| 6 | $R_{31o}$ | 1.45068 | 0.00007 | 0.81247 |
| 7 | $R_{31e}$ | 1.45068 | — | — |
| 8 | $R_{41o}$ | 1.45044 | 0.00002 | 0.80934 |
| 9 | $R_{41e}$ | 1.45043 | — | — |
| 10 | $R_{51o}$ | 1.45014 | 0.00001 | 0.79959 |
| 11 | $R_{51e}$ | 1.45014 | — | — |
| 12 | $R_{61o}$ | 1.44978 | 0.00000 | 0.78037 |
| 13 | $R_{61e}$ | 1.44978 | — | — |

$n_{clad}$ = 1.44968 at 1060 nm.

TABLE VII

Waveguide modes in fiber with core diameter of 14.0 μm & Δn = 0.003 ring $r_1/r_2$ = 14.0/20.0 μm & Δn = 0.00215.

| LP mode | Mode Type | Effective refractive index | Mode overlap integral with core | Mode overlap integral with ring |
|---|---|---|---|---|
| 1 | $LP_{01}$ | 1.45198 | 0.94077 | 0.00038 |
| 2 | $(LP_{11}\text{-}R_{11})_{m1o}$ | 1.45101 | — | — |

TABLE VII-continued

Waveguide modes in fiber with core diameter of 14.0 μm & Δn = 0.003 ring $r_1/r_2$ = 14.0/20.0 μm & Δn = 0.00215.

| LP mode | Mode Type | Effective refractive index | Mode overlap integral with core | Mode overlap integral with ring |
|---|---|---|---|---|
| 3 | $(LP_{11}$-$R_{11})_{m1e}$ | 1.45101 | 0.39740 | 0.39548 |
| 4 | $R_{01}$ | 1.45100 | 0.00258 | 0.80793 |
| 5 | $(LP_{11}$-$R_{11})_{m2o}$ | 1.45091 | — | — |
| 6 | $(LP_{11}$-$R_{11})_{m2e}$ | 1.45091 | 0.42913 | 0.42612 |
| 7 | $R_{21o}$ | 1.45086 | 0.00146 | 0.80846 |
| 8 | $R_{21e}$ | 1.45085 | — | — |
| 9 | $R_{31o}$ | 1.45068 | 0.00027 | 0.81170 |
| 10 | $R_{31e}$ | 1.45068 | — | — |
| 11 | $R_{41o}$ | 1.45044 | 0.00005 | 0.80919 |
| 12 | $R_{41e}$ | 1.45043 | — | — |
| 13 | $R_{51o}$ | 1.45014 | 0.00001 | 0.79953 |
| 14 | $R_{51e}$ | 1.45014 | — | — |
| 15 | $R_{61o}$ | 1.44978 | 0.00073 | 0.77957 |
| 16 | $R_{61e}$ | 1.44978 | — | — |
| 17 | $LP_{21o}$ | 1.44976 | 0.60800 | 0.01824 |

$n_{clad}$ = 1.44968 at 1060 nm.

From Tables V and VI, note the $LP_{11o}$ and $LP_{11e}$ core modes have substantially the same effective indices as the $R_{11e}$ and $R_{11o}$ ring core modes. The modes, of course, are of the same azimuthal order (azimuthal order is 1 in this case). The odd modes and even modes each mix to form two mixed actual fiber modes, resulting in a total of four mixed modes. That is, $LP_{11o}$ mixes with $R_{11o}$ to form the mixed modes LP(2) and LP(5) of Table VII and FIG. 10 (labeled $(LP_{11}$-$R_{11})_{m1o}$ and $(LP_{11}$-$R_{11})_{m2o}$, respectively). Similarly, the $LP_{11e}$ core mode mixes with the $R_{11e}$ ring core mode to form the LP(3) and LP(6) mixed actual fiber modes indicated in Table VII and FIG. 10 (labeled $(LP_{11}$-$R_{11})_{m1e}$ and $(LP_{11}$-$R_{11})_{m2e}$, respectively). The mode field distribution maps of the actual fiber LP(2) and LP(5) modes appear to be logical combinations of the $LP_{11o}$ and $R_{11o}$ modes, and the mode field distribution maps for the LP(3) and LP(6) modes appear as one would expect for combinations of the $LP_{11e}$ and $R_{11e}$ modes. Consideration of the overlap integrals also supports the formation of the identified mixed modes. The overlap integrals for the LP(2), LP(3), LP(5) and LP(6) actual fiber modes have ratios of the higher to lower values on the order of 1, indicating nearly equal distribution in the core and ring core.

Note that the $LP_{21}$ core modes (i.e., the $LP_{21o}$ and $LP_{21e}$, core modes) of Table V have effective refractive indices (1.44978, 1.44979) that are nearly identical those of the $R_{61}$ ring core modes (1.44978) of Table VI. However, full consideration of all data presented in Tables V-VII and FIGS. 8-10 indicates that the $LP_{21}$ and $R_{61}$ modes, though "index matched," do not mix to form a mixed mode, and remain primarily modes of the core and ring core, respectively, in the analysis of the actual fiber. Consider also that the effective indices of the Applicants consider that this is because the $LP_{21}$ core modes are of significantly different azimuthal order (order=2) than the $6^{th}$ order $R_{61}$ ring core modes. This insight—that matching azimuthal order can greatly facilitate selecting modes for mode mixing and is, at least in some circumstances, more important than strict effective index matching and can be a condition for modes to mix—does not appear to be appreciated by the prior art.

Although examples provided herein have focused on preserving the integrity of the fundamental mode and selective suppression of certain HOMs, the teachings herein could be applied, in certain circumstances, to favoring a selected HOM over another HOM at the expense, perhaps, of the fundamental mode. Such an approach is within the scope of the disclosure. It is also considered within the scope of the present disclosure to have both the core $LP_{11}$, and $LP_{02}$ modes mix with ring core modes to form mixed modes. The design may include two ring cores, one surrounding another, where the core $LP_{11}$ mode mixes with a mode of one ring core and the core $LP_{02}$ mode mixes with a mode of the other ring core. In another approach, the core $LP_{02}$ can mix with the ring $R_{02}$ ring core mode and the core $LP_{11}$ mix with a mode of the ring core having a lower order than the $R_{02}$ mode.

Thus, according to one aspect of the disclosure, Applicant has realized that it may not be necessary to address all HOMs according to the same proscription. Certain HOMs, in many applications, are much more likely to be problematic than others, and, accordingly it may not be as important to address those that are less important in the same manner as those that are more problematic. A splice from an SM fiber to a MM fiber is much more likely to excite a HOM having an intensity distribution map that is also substantially central and azimuthally symmetric than other HOMs that are not substantially central and azimuthally symmetric. For example, such a splice is considered more likely to excite the $LP_{02}$ mode shown in FIG. 3 than the $LP_{11}$ mode.

V-number and NA are parameters that are often specified for an optical fiber. Unless otherwise specified, V-number and NA of a core refer to the V-number and the NA of the core considered individually, that is, without consideration of the at least one region that does contribute to the formation of mixed modes. It is noted that the a fiber can be "microstructured," that is, can include features, such as an array of longitudinally extending index modified regions (e.g., an array of voids having an index of refraction different than that of the material defining the voids) that provide a photonic bandgap effect or that macroscopically change the average index of the cladding via a weighted average analysis of the indices of refraction of the silica regions and index modified regions. In the latter instance guidance by the core is still considered to be by total internal reflection (TIR). Microstructured fibers are considered to be within the scope of the present disclosure. For example, in one microstructured design, the "ring" can be formed by leaving out the voids in an annular region disposed about the core. In this instance, analysis of the core individually would include the cladding including the voids (and with the ring including the otherwise missing voids), and a mode considered to be guided "primarily" by the core would of course be affected by the voids.

In another example, an optical fiber according to the present disclosure can comprise a core, a cladding disposed about the core, and optionally a region disposed about the cladding. The optical fiber can include at least one region spaced from the core, where the at least one region can comprise a plurality of satellite regions, which can be individual longitudinally extending voids or index modified regions arranged in a ring or other configuration.

In certain aspects, an optical fiber according to the present disclosure can have a core having a V-number at the wavelength of operation of the fiber of no less than 4.0; no less than 5.0; no less than 6.0; no less than 7.0; or no less than 7.5. In certain aspects of the disclosure the V-number can be from 3.0 to 5.0; from 5.0 to 7.0; or from 7.0 to 10.0. In other aspects of the disclosure, the V-number is not greater than 3, not greater than 3.5, not greater than 4, not greater than 4.5, not greater than 5, or not greater than 5.5.

In other aspects of the disclosure, the core of a fiber can have an NA of no less than 0.12, no less than 0.15, no less than 0.16, or no less than 0.17 at the wavelength of operation of the optical fiber. The NA of the core can be about 0.17.

In additional aspects of the disclosure, the core of a fiber can have a diameter of at least 15 microns; at least 20 microns; at least 25 microns; at least 30 microns; at least 35 microns; at least 40 microns; or at least 50 microns.

Combinations of the foregoing aspects are within the scope of the disclosure, as is appreciated by one of ordinary skill apprised of the disclosure herein. Additional embodiments of optical fiber are now described.

Figure 11:
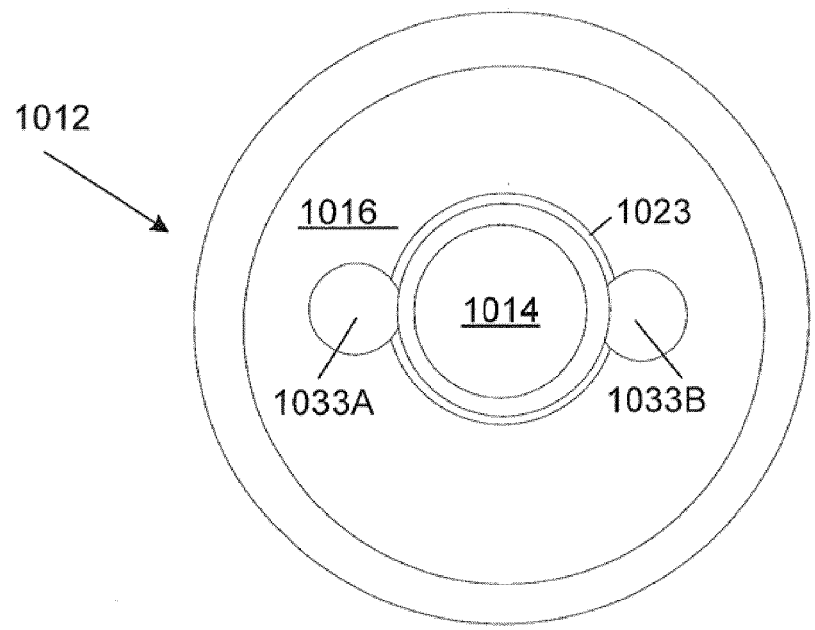
FIG. 11 schematically illustrates a cross section of an optical fiber according to the disclosure including a pair of longitudinally extending stress inducing regions.

FIG. 11 schematically illustrates a cross section of an optical fiber 1012 according to the disclosure that includes, in addition to a core 1014 and at least one region 1023 spaced from the core 1014, a pair of longitudinally, or axially, extending stress inducing regions, indicated by reference numerals 1033A and 1033B. The stress inducing regions 1033A and 1033B can help induce selected birefringence in the optical fiber, such as, for example, via the stress-optic effect. The stress inducing regions can have a thermal coefficient of expansion selected to be different than that of the material of the fiber disposed about the stress inducing regions such that when fiber cools after being drawn stresses are permanently induced. Birefringence refers to at least a region of the fiber, such as, for example, the core 1014, having a substantially different refractive index for one polarization of light than for the orthogonal polarization of light. The fiber 1012 can be a polarization maintaining fiber or a polarizing fiber, depending, at least in part, on the choice of one or more of composition, shape and location of the stress inducing regions. The index of refraction of the stress inducing regions 1033 can be adjusted, via the use of various dopants, including, for example, those noted above, to be lower than that of the cladding 1016, substantially matched to that of the cladding 1016, or even to be higher than that of the cladding 1016.

Figure 12:
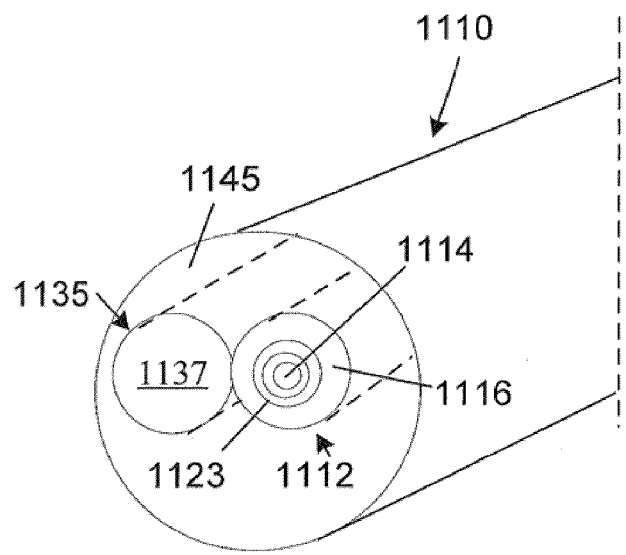
FIG. 12 is a perspective view schematically illustrating one example of an optical apparatus according to the disclosure including a second optical fiber located alongside a first optical fiber and a common cladding disposed about the first and second optical fibers.

FIG. 12 shows a perspective view schematically illustrating one example of an optical fiber apparatus according to the disclosure. The optical apparatus 1110 can include a first optical fiber 1112 that can include, as described above, a core 1114, a cladding 1116 disposed about the core 1114, and at least one region 1123 spaced from the core 1114 for supporting selected mixed modes with the core 1114. The optical fiber 1112 can have a wavelength of operation and can include a rare earth material for providing optical energy having the wavelength of operation responsive to the optical fiber 1112 receiving pump optical energy having a pump wavelength. The optical fiber apparatus 1110 can include a second optical fiber 1135 located alongside the first optical fiber, and the second optical fiber can include at least a core 1137. The optical fiber apparatus 1110 can include a common cladding 1145 disposed about the first and second optical fibers. The common cladding 1145 can be constructed and arranged so as to tend to confine optical energy to the core 1137 of the second optical fiber 1135 for guidance by the core 1137. The second optical fiber 1135 can propagate pump optical energy and the first and second optical fiber located alongside one another, as shown in FIG. 10, such that the pump optical energy couples to the first optical fiber 1112 for optically pumping the rare earth material comprised by, for example, the core 1114 of the first optical fiber 1112. The first and second optical fibers, 1112 and 1135, respectively, can be drawn together within the common cladding 1145. The optical apparatus 1110 can be constructed and arranged such that the first and second optical fibers can be accessed individually at the ends of a length of the optical fiber apparatus 1110 so as to, for example, couple pump optical energy to the second optical fiber for subsequent coupling to the first optical fiber and to deliver a signal to and/or extract a signal from the core 1114 of the first optical fiber 1112.

An optical fiber apparatus can be configured, according to one aspect of the disclosure, as a laser. Such as laser can comprise at least one reflector, which can comprise a grating, such as, for example, a Bragg grating formed via the selective application of actinic radiation to, for example, a photosensitive section of optical fiber. The laser can comprise a second reflector. One of the reflectors is usually less reflective than the other of the reflectors, as is known in the art. Two spaced reflectors can form a laser cavity therebetween. The laser can also be configured as a distributed feedback (DFB) laser, and can use a distributed reflector, typically in the form of one grating having a phase change therein, and can provide narrow linewidth light. A laser can also be configured in a master oscillator-power amplifier (MOPA) arrangement, where a master oscillator, such as a diode or fiber laser, seeds an optical fiber amplifier. Optical fiber apparatus according to the disclosure can include a fiber optical coupler for coupling pump light to the optical fiber apparatus, as well as a source of pump optical energy, which can comprise one or more pump diodes.

As noted above, an optical fiber can comprise a rare earth material for providing light of a first wavelength responsive to the fiber receiving (e.g., being "pumped by") light of a second wavelength (e.g., "pump light"). "Rare earth material," as used herein, means one or more rare earths, typically included in the fiber in the form of rare earth ions. The rare earths can be selected by those of ordinary skill in the art of the field of pumped fibers, for example from the Lanthanide group of elements in the periodic table (materials having the atomic numbers 57-71). The optical fiber can be pumped as shown in FIG. 8 and discussed above. Also, the optical fiber can be "end-pumped" as is known in the art, and can include a second, or "pump" cladding for propagating the pump light delivered to the optical fiber via the end pumping.

The refractive index profiles shown in the foregoing FIGURES are idealized. Actual refractive index profiles measured on a preform or from an actual optical fiber drawn from the preform can include other features, as is well known in the art, such as rounded edges between sections and the signature "dip" in the index of refraction of the core due to the burnoff of dopants in the core during the collapse stage of the Modified Chemical Vapor Deposition (MCVD) process (assuming that the MCVD process is used to fabricate the optical fiber preform). Also, some of the sections of the refractive index profile corresponding to a particular region of the fiber are drawn to portray the index of refraction as substantially constant for the region. This need not be true in all practices of the disclosure. As is well known in the art, the index of refraction of a region of a fiber, such as the core of a fiber, need not be constant, and can be varied according to a predetermined function to provide a particular result. For example, it is known in the art to provide a core comprising a graded refractive index profile, where the profile corresponds to a parabola or other suitable function.

Several embodiments of the invention have been described and illustrated herein. Those of ordinary skill in the art will readily envision a variety of other means and structures for performing the functions and/or obtain the results or advantages described herein and, each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teaching of the present disclosure is used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

In the claims as well as in the specification above all transitional phrases such as "comprising," "including," "carrying," "having," "containing," "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7$^{th}$ Edition, Revision.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time).

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one widget" and subsequent recitation that "said at least one widget is colored red" does not mean that the claim requires all widgets of an apparatus that has more than one widget to be red. The claim shall read on an apparatus having one or more widgets provided simply that at least one of the widgets is colored red.

What is claimed is:

1. Optical fiber apparatus having a wavelength of operation at which said optical fiber apparatus propagates optical energy, comprising:
    an optical fiber, said optical fiber including
    a core;
    a pump cladding disposed about said core, said pump cladding for receiving pump optical energy having a pump wavelength;
    a second cladding disposed about said pump cladding for tending to confine pump optical energy to said pump cladding for propagation thereby;
    said core comprising a rare earth material for providing optical energy having the wavelength of operation responsive to said optical fiber receiving the pump optical energy having the pump wavelength;
    at least one ring core spaced from said core, said ring core defined by inner and outer diameters and comprising the cross sectional area therebetween, said ring core further comprising an absorbing material for absorbing optical energy having the wavelength of operation;
    wherein said optical fiber is configured and arranged such that at said wavelength of operation said optical fiber comprises a fundamental mode that is primarily a mode of said core and at least one higher order mode (HOM) that is a mixed mode of a selected mode of said core and of selected mode of said ring core, said selected modes being of the same azimuthal order; and
    wherein said mixed mode is suppressed relative to said fundamental mode.

2. The optical fiber apparatus of claim 1 wherein said selected mode of said core composes the $LP_{02}$ mode of said core.

3. The optical fiber apparatus of claim 1 wherein said selected mode of said core comprises the $LP_{11}$ mode of said core.

4. The optical fiber apparatus of claim 1 wherein the intensity profile of said at least one HOM comprises a substantially central maxima.

5. The optical fiber apparatus of claim 1 wherein the intensity profile of said at least one HOM comprises a substantially central minima.

6. The optical fiber apparatus of claim 1 wherein said pump cladding consists essentially of pure silica.

7. The optical fiber apparatus of claim 1 wherein said fiber does not include a microstructure for providing guidance of optical energy.

8. The optical fiber apparatus of claim 1 wherein said rare earth material comprises at least one of ytterbium, erbium, neodymium and thulium.

9. The optical fiber apparatus of claim 1 wherein absorbing material comprises at least one of samarium, praseodymium or terbium.

10. The optical fiber apparatus of claim 1 wherein said pump wavelength comprises a wavelength of about 790 nm and said absorbing material comprises samarium.

11. The optical fiber apparatus of claim 1 wherein said pump wavelength comprises a wavelength of about 1567 nm and said absorbing material comprises terbium.

12. The optical fiber apparatus of claim 1 wherein said wavelength of operation comprises a wavelength of about 1060 nm and wherein said absorbing material comprises samarium or praseodymium.

13. The optical fiber apparatus of claim 1 wherein said rare earth material comprises neodymium and wherein said absorbing material comprises praseodymium.

14. The optical fiber apparatus of claim 1 wherein said at least one HOM is suppressed such that the propagation loss of said at least one HOM is at least 10 times, in terms of dB per meter, higher than the propagation loss of said fundamental mode at the wavelength of operation.

15. The optical fiber apparatus of claim 1 wherein said optical fiber comprises at least one longitudinally extending stress inducing region having a thermal coefficient of expansion that is different than material of said optical fiber disposed about said stress inducing region, said stress inducing region for increasing the birefringence of said optical fiber for providing polarization maintaining propagation of the fundamental mode.

16. The optical fiber apparatus of claim 1 wherein said optical fiber extends along a longitudinal axis and wherein said optical fiber apparatus comprises a second longitudinally extending optical fiber, said second optical fiber located alongside said first optical fiber such that pump optical energy propagated by said second optical fiber can couple to said pump cladding of said optical fiber for optically pumping said active material; and a selected cladding disposed about said optical fiber and said second optical fiber.

17. The optical fiber apparatus of claim 1 wherein said optical fiber apparatus is configured as a laser having a laser cavity defined by at least one optical fiber Bragg orating.

18. The optical fiber apparatus of claim 1 wherein said optical fiber apparatus is configured as a laser include a master oscillator power amplifier (MOPA) arrangement.

19. The optical fiber apparatus of claim 1 wherein said rare earth material comprises thulium, and said absorbing material comprises terbium.

20. The optical fiber apparatus of claim 1 wherein said ring core comprises a silica based glass comprising a concentration of aluminum.

* * * * *